(12) United States Patent
Horita

(10) Patent No.: US 12,553,832 B2
(45) Date of Patent: Feb. 17, 2026

(54) MONITORING DESIGN SUPPORT APPARATUS, MONITORING DESIGN SUPPORT METHOD, AND PROGRAM

(71) Applicant: FUJIFILM Corporation, Tokyo (JP)

(72) Inventor: Shuhei Horita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 33 days.

(21) Appl. No.: 18/477,038

(22) Filed: Sep. 28, 2023

(65) Prior Publication Data

US 2024/0019379 A1 Jan. 18, 2024

Related U.S. Application Data

(63) Continuation of application No. PCT/JP2022/004710, filed on Feb. 7, 2022.

(30) Foreign Application Priority Data

Mar. 30, 2021 (JP) .................. 2021-057276

(51) Int. Cl.
*G01N 21/88* (2006.01)

(52) U.S. Cl.
CPC . *G01N 21/8851* (2013.01); *G01N 2021/8854* (2013.01); *G01N 2021/8883* (2013.01)

(58) Field of Classification Search
CPC ........................... G01N 21/8851; G06Q 10/20
See application file for complete search history.

(56) References Cited

U.S. PATENT DOCUMENTS

2018/0189705 A1* 7/2018 Nonaka ............ G06Q 10/06315
2018/0189749 A1* 7/2018 Takamori ................ G06Q 10/20
2018/0292328 A1* 10/2018 Karube .............. G01N 21/8851

FOREIGN PATENT DOCUMENTS

JP   2017-071972 A   4/2017
JP   2019-023901 A   2/2019
(Continued)

OTHER PUBLICATIONS

International Search Report issued in PCT/JP2022/004710; mailed Apr. 19, 2022.
Written Opinion of the International Searching Authority issued in PCT/JP2022/004710; mailed Apr. 19, 2022.
"Notice of Reasons for Refusal" Office Action issued in JP 2023-510582; mailed by the Japanese Patent Office on Aug. 6, 2025.
(Continued)

*Primary Examiner* — Thanh Luu
(74) *Attorney, Agent, or Firm* — Studebaker Brackett PLLC

(57) ABSTRACT

A monitoring design support apparatus, a monitoring design support method, and a program that enable efficient monitoring for a structure are provided. A monitoring design support apparatus includes a processor and supports monitoring design for a structure. The processor executes structure information acquisition processing of acquiring structure information on a target structure; monitoring candidate portion determination processing of determining a monitoring candidate portion where damage is likely to occur based on the structure information on the target structure; damage information acquisition processing of acquiring damage information on the target structure including information relating to a damage position and a damage level in the target structure; monitoring portion determination processing of determining a monitoring portion from the monitoring candidate portion based on the damage level included in the damage information on the target structure corresponding to the monitoring candidate portion; and output processing of outputting the monitoring portion.

17 Claims, 13 Drawing Sheets

(56) References Cited

FOREIGN PATENT DOCUMENTS

| | | |
|---|---|---|
| JP | 2019-082933 A | 5/2019 |
| WO | 2017/043276 A1 | 3/2017 |
| WO | 2017/110278 A1 | 6/2017 |

OTHER PUBLICATIONS

An Office Action, "Notice of Reasons for Refusal," mailed by the Japanese Patent Office on Dec. 24, 2025, which corresponds to Japanese Patent Application No. 2023-510582 and is related to U.S. Appl. No. 18/477,038; with English language translation.

* cited by examiner

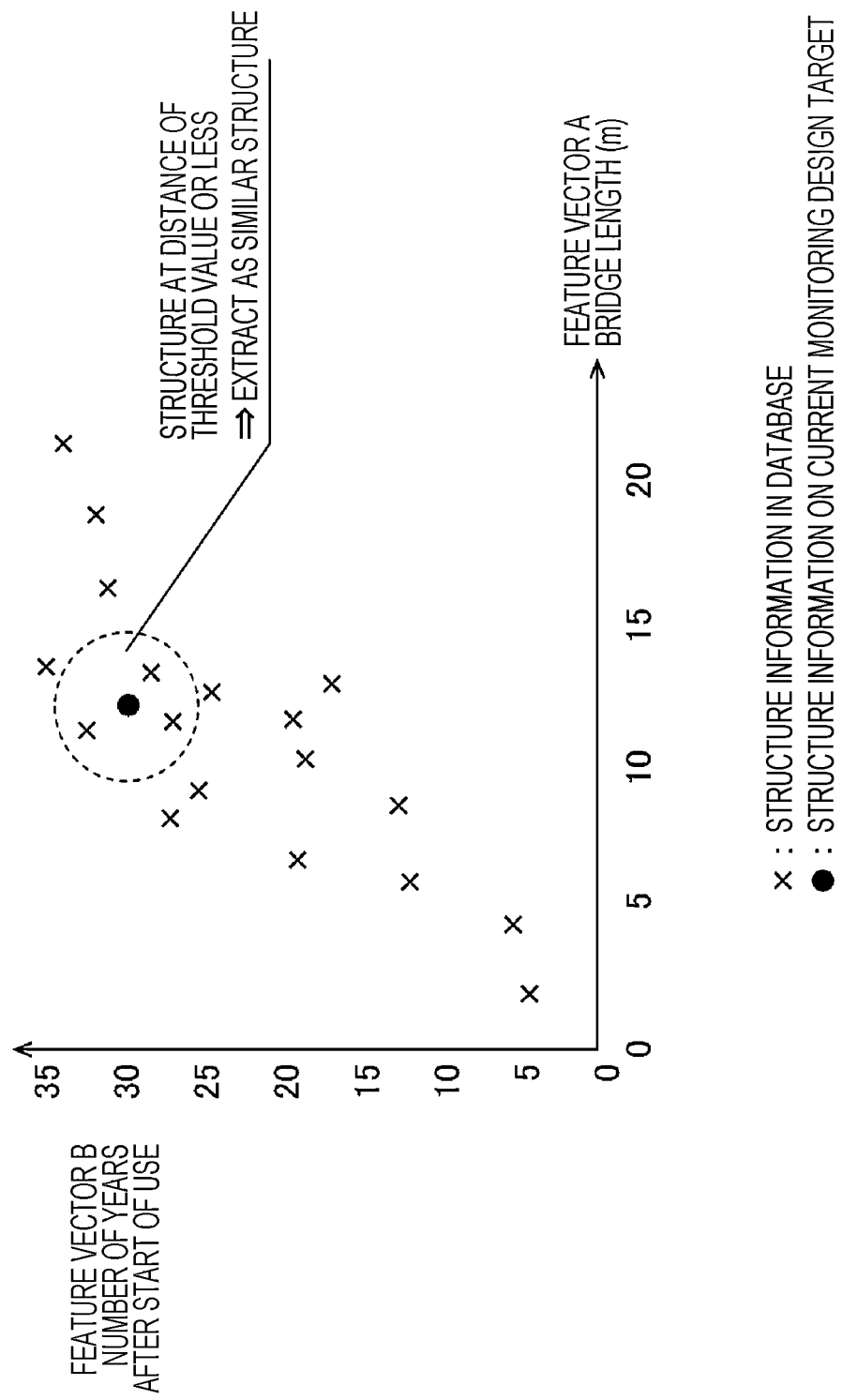

| MEMBER (POSITION) | DAMAGE TYPE | DAMAGE DIMENSION | DAMAGE LEVEL | TEMPORAL CHANGE |
|---|---|---|---|---|
| BRIDGE PIER 001 | CRACK | L=1.0m | a | +0.1m, a⇒a |
| BRIDGE PIER 001 | CRACK | L=2.1m | b | +0.3m, a⇒b |
| BRIDGE PIER 002 | FREE LIME | L=0.5m | c | +0m, c⇒c |
| FLOOR SLAB 001 | FREE LIME | L=1.0m | d | +0.2m, c⇒d |
| FLOOR SLAB 002 | SPALLING | S=1.0m² | a | +0.25m², a⇒a |
| MAIN GIRDER 001 | STEEL BAR EXPOSURE | L=0.5m | d | +0.15m, c⇒d |
| MAIN GIRDER 002 | FLAKING | – | d | ±0, d⇒d |
| BRIDGE ABUTMENT 002 | SPALLING | S=0.5m² | d | +0.2m², d⇒d |
| BRIDGE ABUTMENT 002 | WATER LEAKAGE | L=3.0m | a | ±0m, a⇒a |
| MAIN GIRDER 001 | CORROSION | S=3.0m² | c | +0.4m², c⇒c |

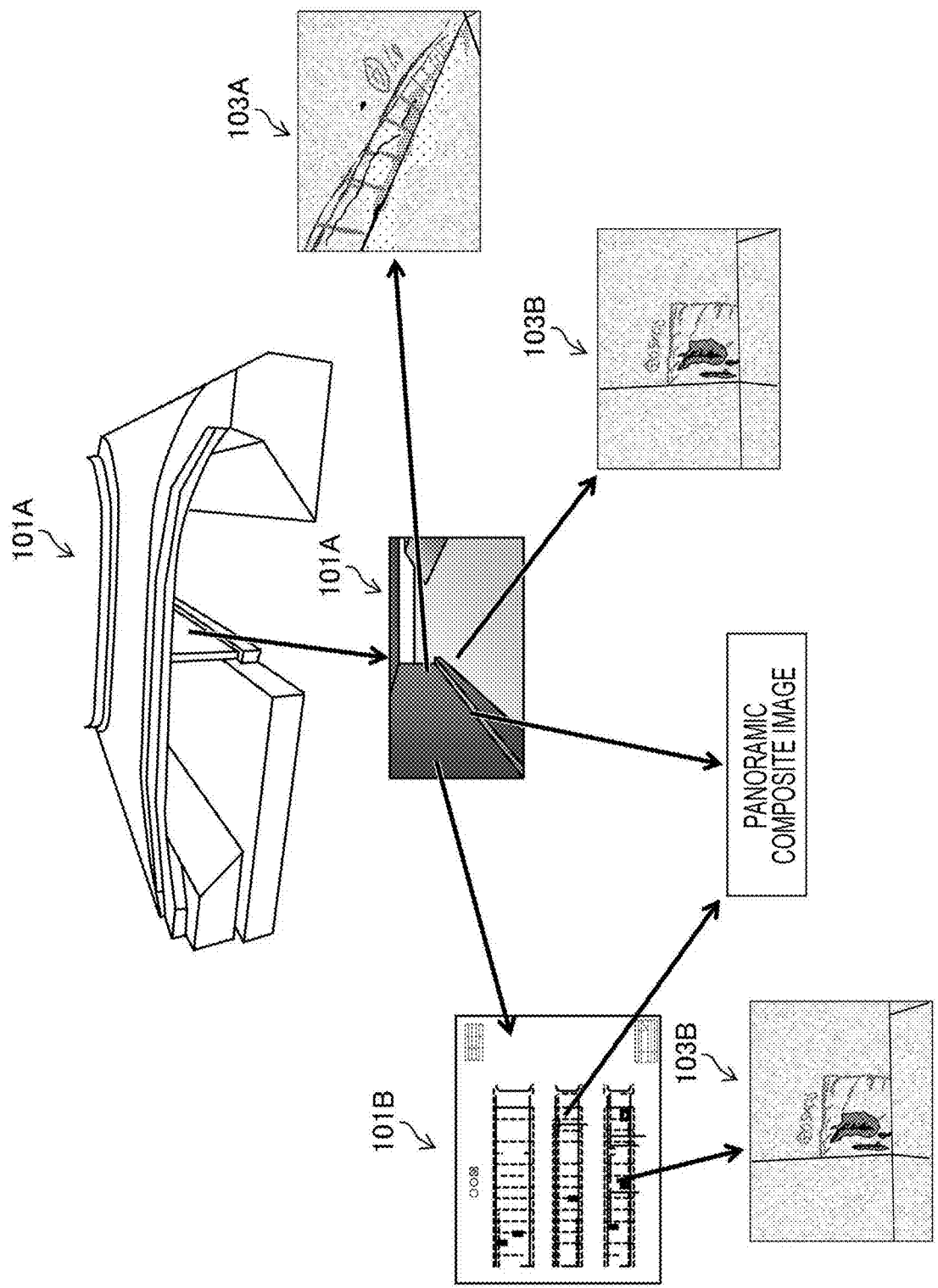

MONITORING DESIGN SUPPORT APPARATUS, MONITORING DESIGN SUPPORT METHOD, AND PROGRAM

CROSS-REFERENCE TO RELATED APPLICATIONS

The present application is a Continuation of PCT International Application No. PCT/JP2022/004710 filed on Feb. 7, 2022 claiming priority under 35 U.S.C § 119(a) to Japanese Patent Application No. 2021-057276 filed on Mar. 30, 2021. Each of the above applications is hereby expressly incorporated by reference, in its entirety, into the present application.

BACKGROUND OF THE INVENTION

1. Field of the Invention

The present invention relates to a monitoring design support apparatus, a monitoring design support method, and a program.

2. Description of the Related Art

As social infrastructures, there are structures such as a bridge and a tunnel. Damage occurs in these structures and the damage has a characteristic of progressing, and hence it is requested to periodically perform an inspection.

Thus, JP2019-082933A discloses that a first inspection plan is created for a structure based on deterioration estimation, an inspection is performed based on the first inspection plan, and then a more detailed second inspection plan is performed based on a result of an inspection item and an inspection criterion of the first inspection plan.

SUMMARY OF THE INVENTION

In an inspection for a structure such as a bridge, a monitoring technology of monitoring the progress of deterioration using a sensor or the like is applied. When multiple various sensors are installed and various data are acquired, the progress of deterioration can be reliably recognized. In contrast, in monitoring, there is a problem in that installation and operation of the multiple sensors and accumulation and analysis of data cost much.

The present invention is made in view of the situation, and an object of the invention is to provide a monitoring design support apparatus, a monitoring design support method, and a program that enable efficient monitoring for a structure.

A monitoring design support apparatus according to a first embodiment is a monitoring design support apparatus that includes a processor and supports monitoring design for a structure. The processor executes structure information acquisition processing of acquiring structure information on a target structure; monitoring candidate portion determination processing of determining a monitoring candidate portion where damage is likely to occur based on the structure information on the target structure; damage information acquisition processing of acquiring damage information on the target structure including information relating to a damage position and a damage level in the target structure; monitoring portion determination processing of determining a monitoring portion from the monitoring candidate portion based on the damage level included in the damage information on the target structure corresponding to the monitoring candidate portion; and output processing of outputting the monitoring portion.

According to a second embodiment, the monitoring design support apparatus further includes a first database that holds a correspondence relationship between structure information on a representative structure and a representative monitoring candidate portion. The monitoring candidate portion determination processing acquires information on the representative monitoring candidate portion having the correspondence relationship with the representative structure identical or similar to the target structure from the first database based on the structure information on the target structure and the structure information on the representative structure, and determines the monitoring candidate portion.

According to a third embodiment, the monitoring design support apparatus further includes a second database that holds a correspondence relationship between structure information on a reference structure and damage information on the reference structure. The processor executes similar structure extraction processing of extracting the reference structure similar to the target structure from the second database based on the structure information on the target structure and the structure information on the reference structure. The monitoring candidate portion determination processing determines the monitoring candidate portion based on the damage information having the correspondence relationship with the structure information on the extracted reference structure.

According to a fourth embodiment, in the monitoring design support apparatus, the second database holds other information relating to the reference structure. The similar structure extraction processing extracts the reference structure similar to the target structure from the second database based on the structure information on the target structure, the structure information on the reference structure, other information on the target structure, and the other information relating to the reference structure.

According to a fifth embodiment, in the monitoring design support apparatus, the processor executes simulation processing of simulating a deterioration factor based on the structure information on the target structure. The processor executes the monitoring candidate portion determination processing based on a result of the simulation.

According to a sixth embodiment, in the monitoring design support apparatus, based on an image associated with a position on the target structure and a damage level determined from the image, the damage information acquisition processing acquires information relating to the damage level.

According to a seventh embodiment, in the monitoring design support apparatus, based on a damage level determined from images obtained at at least two different timings and associated with a position on the target structure, the damage information acquisition processing acquires information relating to the damage level.

According to an eighth embodiment, in the monitoring design support apparatus, the monitoring portion determination processing determines, as the monitoring portion, the monitoring candidate portion from which the damage portion exists within a predetermined distance and for which the damage level is included in a setting.

According to a ninth embodiment, in the monitoring design support apparatus, the monitoring portion determination processing determines, as the monitoring portion, the monitoring candidate portion located on a same member as a member of the monitoring candidate portion.

According to a tenth embodiment, in the monitoring design support apparatus, the processor receives editing for the monitoring portion, and executes editing processing of changing the monitoring portion.

According to an eleventh embodiment, in the monitoring design support apparatus, the editing processing receives the editing on a three-dimensional model, a two-dimensional drawing, or a list displayed on a display device.

According to a twelfth aspect, the monitoring design support apparatus further includes a third database that holds information relating to a sensor capable of monitoring the monitoring portion. The processor executes sensor determination processing of determining the sensor to be applied from the third database based on the damage information on the monitoring portion.

A monitoring design support method according to a thirteenth embodiment is a monitoring design support method that includes a processor and supports monitoring design for a structure. The method, using the processor, executes a structure information acquisition step of acquiring structure information on a target structure; a monitoring candidate portion determination step of determining a monitoring candidate portion where damage is likely to occur based on the structure information on the target structure; a damage information acquisition step of acquiring damage information on the target structure including information relating to a damage position and a damage level in the target structure; a monitoring portion determination step of determining a monitoring portion from the monitoring candidate portion based on the damage level included in the damage information on the target structure corresponding to the monitoring candidate portion; and an output step of outputting the monitoring portion.

A program according to a fourteenth embodiment is a monitoring design support program causing a computer to support monitoring design for a structure. The program causes the computer to implement the functions of: a structure information acquisition function of acquiring structure information on a target structure; a monitoring candidate portion determination function of determining a monitoring candidate portion where damage is likely to occur based on the structure information on the target structure; a damage information acquisition function of acquiring damage information on the target structure including information relating to a damage position and a damage level in the target structure; a monitoring portion determination function of determining a monitoring portion from the monitoring candidate portion based on the damage level included in the damage information on the target structure corresponding to the monitoring candidate portion; and an output function of outputting the monitoring portion.

With the monitoring design support apparatus for the structure, the monitoring design support method for the structure, and the program according to the present invention, the efficient monitoring for the structure is enabled.

BRIEF DESCRIPTION OF THE DRAWINGS

FIG. 8 is a graph presenting an example of a method of extracting a similar structure;

FIG. 9 is a table presenting an example of damage information on a target structure;

FIG. 10 is a diagram for explaining association between structure information and damage information on a target structure;

DESCRIPTION OF THE PREFERRED EMBODIMENTS

Hereinafter, preferred embodiments of a monitoring design support apparatus for a structure, a monitoring design support method for a structure, and a program according to the present invention will be described with reference to the accompanying drawings. Here, the "structure" includes a construction, for example, a civil engineering structure, such as a bridge, a tunnel, or a dam, and also includes an architecture, such as a building, a house, a wall of a building, a pillar of a building, or a beam of a building.

Hardware Configuration of Monitoring Design Support Apparatus for Structure

Figure 1:
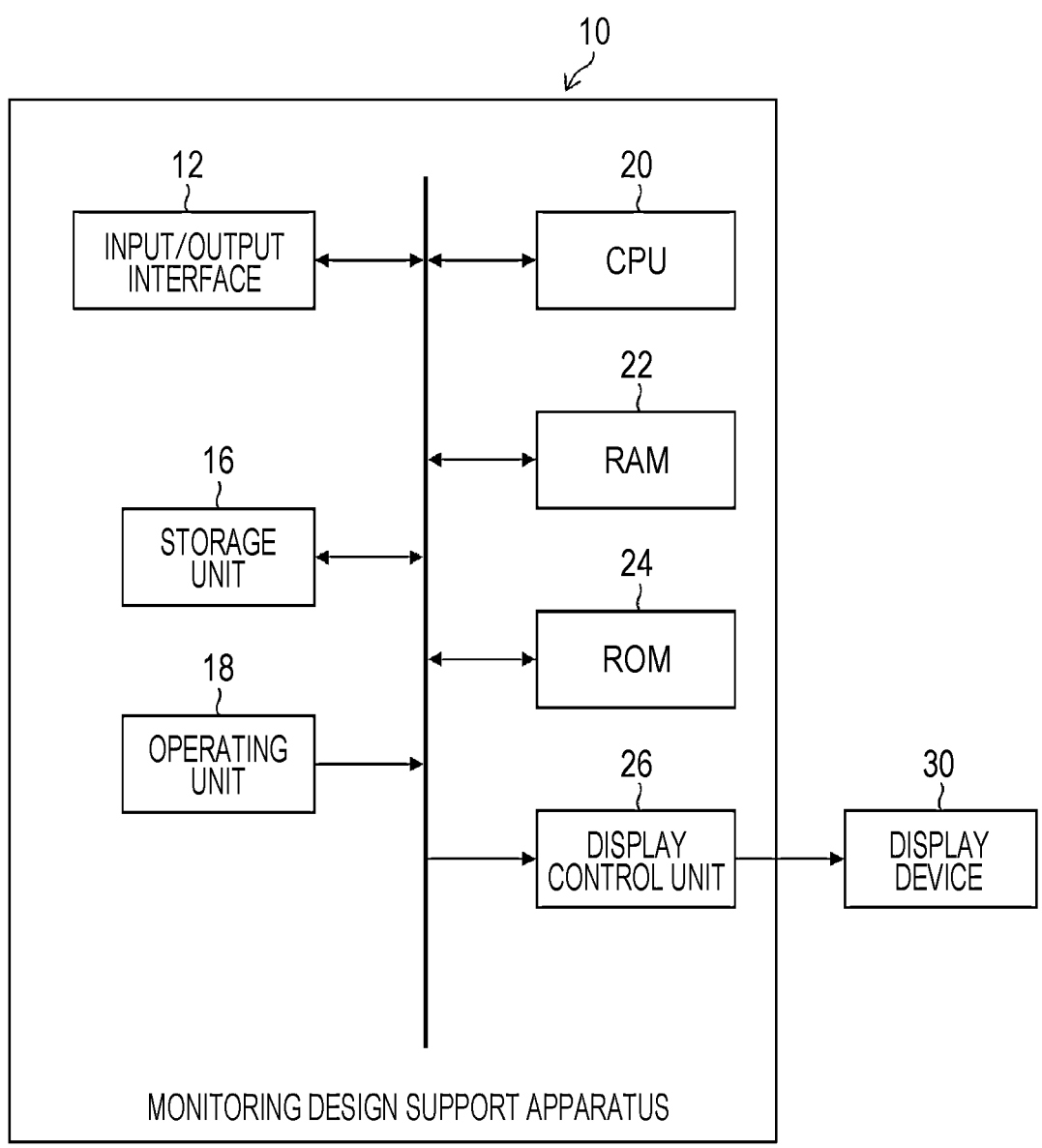
FIG. 1 is a block diagram illustrating an example of a hardware configuration of a monitoring design support apparatus for a structure.

FIG. 1 is a block diagram illustrating an example of a hardware configuration of a monitoring design support apparatus for a structure according to the present invention.

As a monitoring design support apparatus 10 for a structure illustrated in FIG. 1, a computer or a workstation can be used. The monitoring design support apparatus 10 for a structure of the present example is mainly composed of an input/output interface 12, a storage unit 16, an operating unit 18, a central processing unit (CPU) 20, a random access memory (RAM) 22, a read only memory (ROM) 24, and a display control unit 26. A display device 30 constituting a display is connected to the monitoring design support apparatus 10 for a structure, and displaying is performed on the display device 30 with the control of the display control unit 26 under a command of the CPU 20. The display device 30 is constituted of, for example, a monitor.

The input/output interface 12 can input various data (information) to the monitoring design support apparatus 10 for a structure. For example, data to be stored in the storage unit 16 is input via the input/output interface 12.

The CPU (processor) 20 reads out various programs stored in the storage unit 16, the ROM 24, or the like, and including an inspection support program for a structure according to the embodiment, and loads the programs into the RAM 22 to perform calculation, thereby generally controlling each unit. Also, the CPU 20 reads out the programs stored in the storage unit 16, the ROM 24, or the like, performs calculation using the RAM 22, and performs various kinds of processing of the monitoring design support apparatus 10 for a structure.

Figure 2:
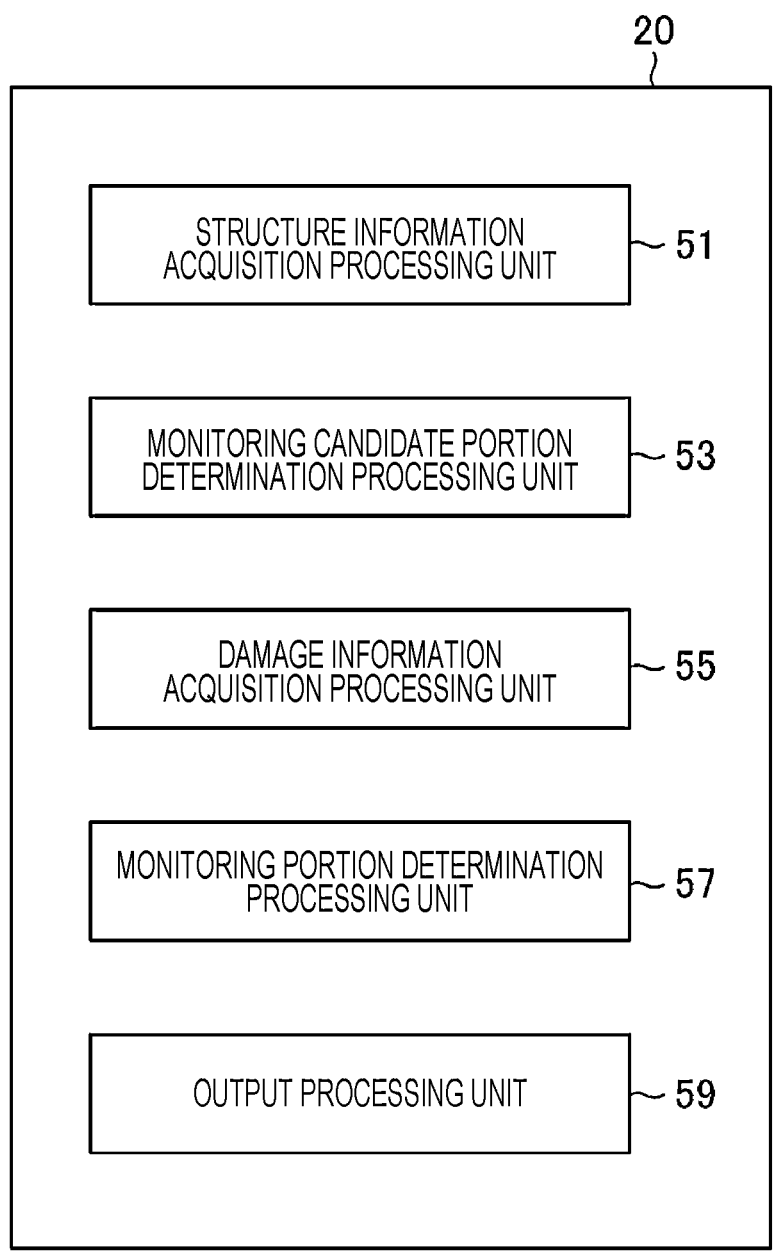
FIG. 2 is a block diagram illustrating processing functions implemented by a CPU.

FIG. 2 is a block diagram illustrating processing functions implemented by the CPU. As illustrated in FIG. 2, the CPU 20 has a structure information acquisition processing unit 51, a monitoring candidate portion determination processing unit 53, a damage information acquisition processing unit 55, a monitoring portion determination processing unit 57, an output processing unit 59, and the like. Specific processing functions of the respective units will be described later. The structure information acquisition processing unit 51, the monitoring candidate portion determination processing unit 53, the damage information acquisition processing unit 55, the monitoring portion determination processing unit 57, and the output processing unit 59 are units of the CPU 20, and the CPU 20 can execute processing of each unit.

Referring back to FIG. 1, the storage unit (memory) 16 is a memory composed of a hard disk device, a flash memory, or the like. The storage unit 16 stores data and a program for operating the monitoring design support apparatus 10 for a structure, such as an operating system and a program for executing a monitoring design support method for a structure. The storage unit 16 also stores information and the like used in the embodiments which will be described below.

Figure 3:
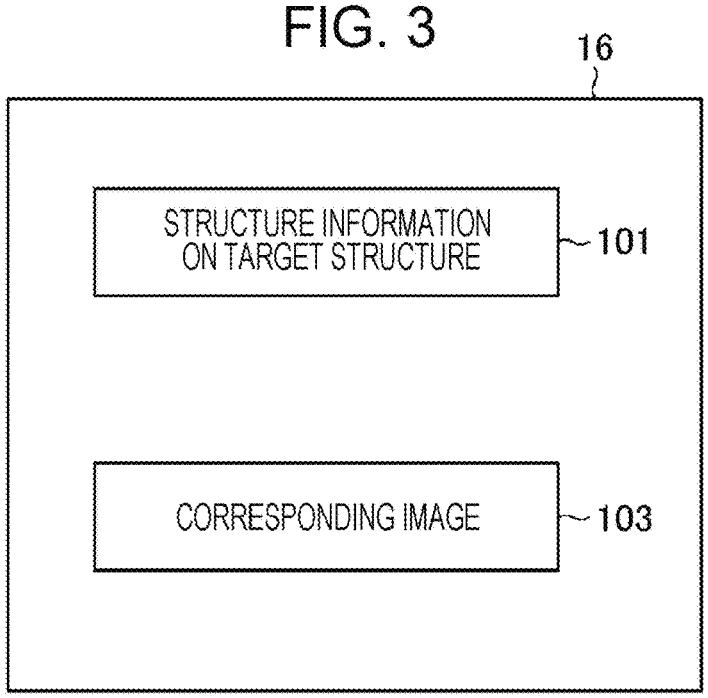
FIG. 3 is a diagram illustrating information and the like stored in a storage unit.

FIG. 3 is a diagram illustrating information and the like stored in the storage unit 16. The storage unit 16 is constituted of a non-transitory recording medium, such as a compact disk (CD), a digital versatile disk (DVD), a hard disk, or any of various semiconductor memories, and a control unit thereof.

The storage unit 16 mainly stores structure information 101 on a target structure, a corresponding image 103 associated with a position on the structure, and the like.

The structure information 101 on the target structure includes a three-dimensional model (including information on a member region, a member name, a material, etc.), a two-dimensional drawing, a panoramic composite image, or information on a structure type name, a member name, a material name, and the like, of the target structure. The three-dimensional model can be created based on, for example, a plurality of captured images. The three-dimensional model can also serve as the corresponding image 103 (described later). For the information on the member region, the member name, the material, and the like, the member region, the member name, and the material of each member may be specified on the three-dimensional model. The member region and the member name may be automatically specified for the three-dimensional model from information relating to the shape, the dimensions, and the like, of the member. Alternatively, the member region and the member name may be specified for the three-dimensional model based on an operation of the user. The two-dimensional drawing includes, for example, an overall view, a general view, a structural view, and a damage view (for each member, such as a floor slab or a bridge pier). The panoramic composite image is an image (for each member, such as a floor slab or a bridge pier) composited from captured images. The structure information 101 on the target structure may be any one item of information, or may include a plurality of items of information.

The corresponding image 103 is an image of the target structure, and is, for example, an image associated with a position on the target structure based on the structure information 101 on the target structure. The corresponding image 103 can include images obtained at at least two different timings and associated with a position on the target structure.

The operating unit 18 illustrated in FIG. 1 includes a keyboard and a mouse, and a user can cause the monitoring design support apparatus 10 to perform necessary processing via these devices. When a touch panel type device is used, the display device 30 can also serve as the operating unit 18.

The display device 30 is, for example, a device such as a liquid crystal display, and can output the structure information 101 on the target structure, the corresponding image 103, and a monitoring portion in accordance with an instruction of the CUP 20.

Figure 4:
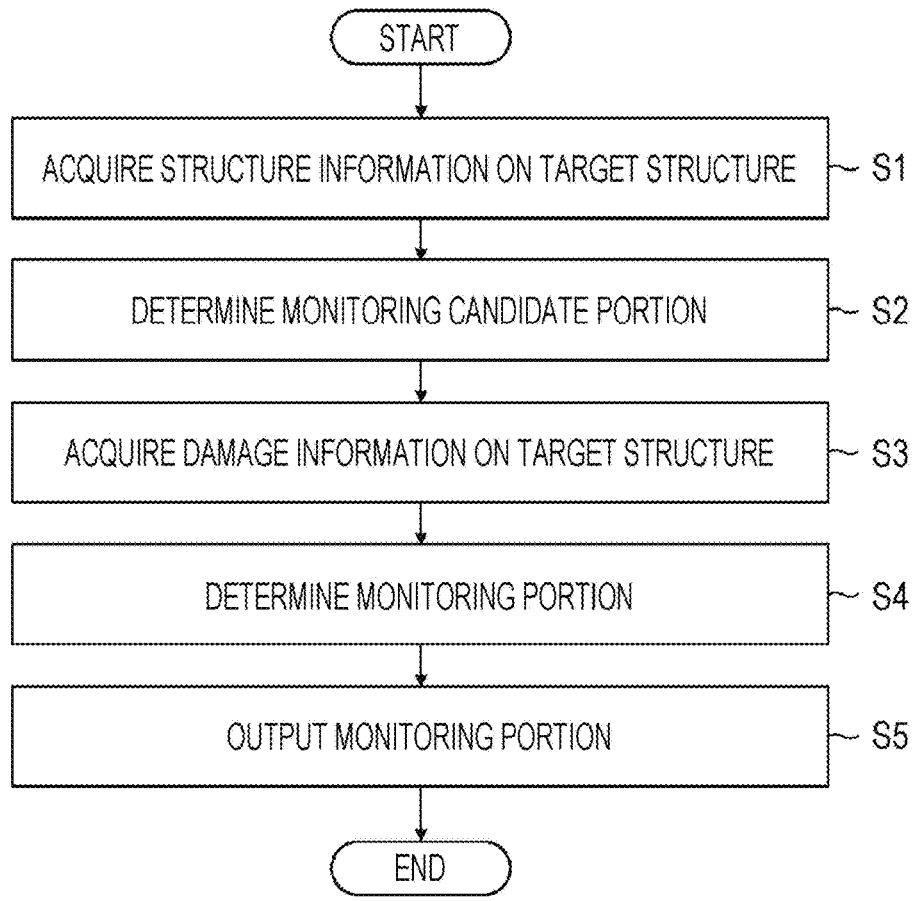
FIG. 4 is a flowchart presenting a monitoring design support method using the monitoring design support apparatus for a structure.

FIG. 4 is a flowchart presenting a monitoring design support method for a structure using the monitoring design support apparatus for a structure.

Structure Information Acquisition Step

A structure information acquisition step (step S1) acquires structure information 101 on a target structure that is a monitoring design target. The structure information acquisition processing unit 51 of the CPU 20 acquires the structure information 101 on the target structure stored in the storage unit 16. The structure information 101 on the target structure includes, as described above, a three-dimensional model (including information on a member region, a member name, a material, etc.), a two-dimensional drawing, a panoramic composite image, or information on a structure type name, a member name, a material name, and the like, of the target structure.

When the structure information 101 on the target structure is not stored in the storage unit 16, the structure information 101 on the target structure may be acquired from another storage unit through a network via the input/output interface 12. As described above, the CPU functions as the structure information acquisition processing unit 51.

Figure 5:
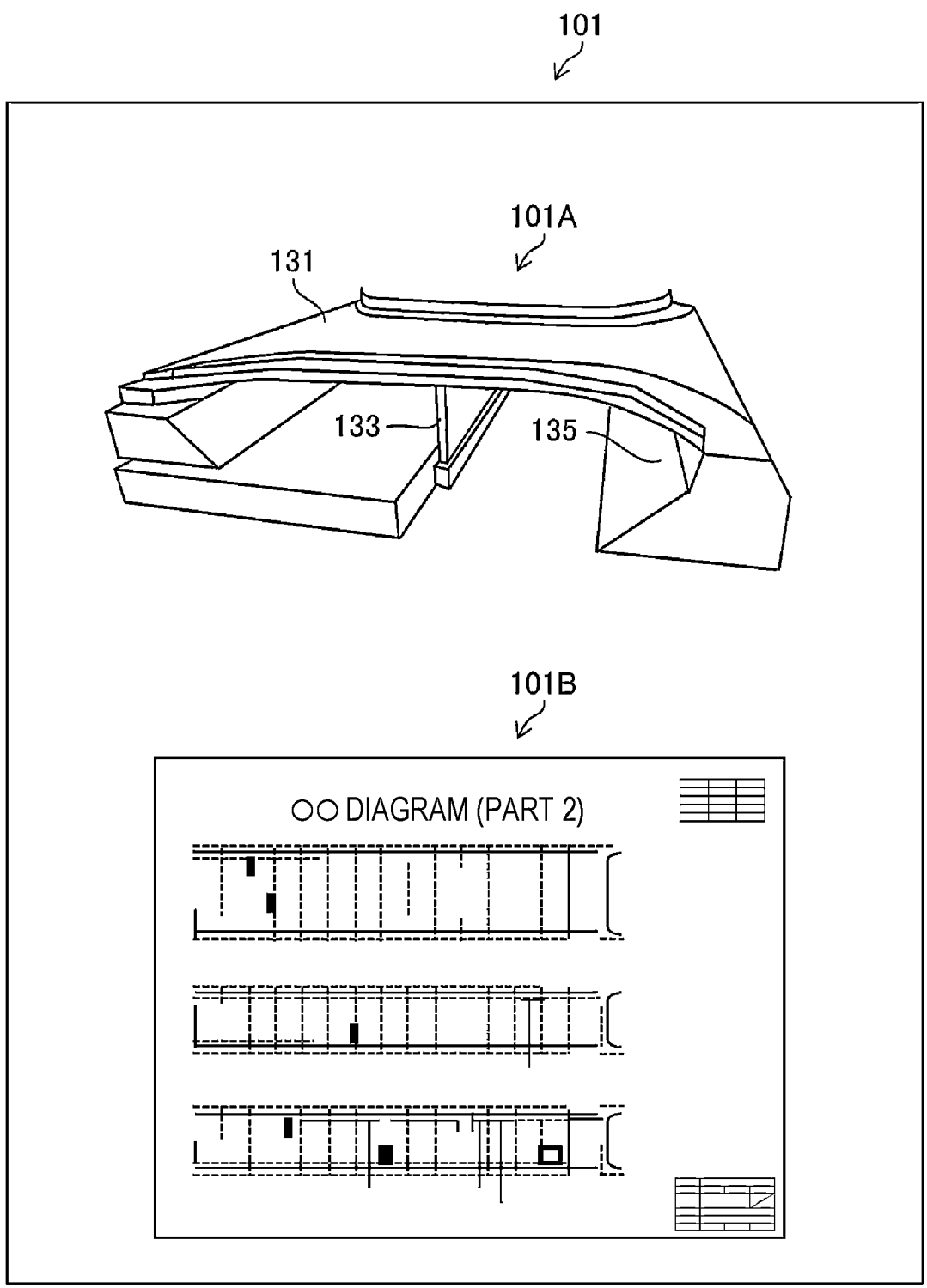
FIG. 5 is a view illustrating an example of structure information on a target structure.

FIG. 5 illustrates a three-dimensional model 101A and a two-dimensional drawing 101B that are examples of the structure information 101 on the target structure. The three-dimensional model 101A included in the structure information 101 on the target structure can be displayed using a point cloud, a polygon (mesh), a solid model, or the like. The three-dimensional model 101A in FIG. 5 is a view in which captured images (textures) obtained by image-capturing a structure are texture-mapped on a polygon having a polygonal shape.

In the example in FIG. 5, the three-dimensional model 101A can include a member name and a member region. The three-dimensional model 101A is composed of, for example, a floor slab 131, a bridge pier 133, and a bridge abutment 135.

A technique of creating the three-dimensional model 101A is not limited. There are various models, and the three-dimensional model 101A can be created using, for example, a technique of structure from motion (SfM). The SfM is a technique of recovering a three-dimensional shape from multi-view pictures, and for example, feature points are calculated using an algorithm such as scale-invariant feature transform (SIFT), and three-dimensional positions of a point cloud are calculated using the feature points as a clue and the principle of triangulation. Specifically, straight lines are drawn from the camera to feature points using the principle of triangulation, and the intersection of two straight lines passing through corresponding feature points is a recovered three-dimensional point. By performing this work for each detected feature point, the three-dimensional positions of the point cloud can be obtained.

Although the size is not calculated using the SfM, the size can be associated with the actual scale by, for example, installing a scaler having known dimensions on a subject and performing image capturing.

The two-dimensional drawing 101B is information displayed in two dimensions, such as an overall view that is a schematic view of the entirety of the bridge, a general view examples of which include a plan view, a side view, and a sectional view, or a structural view. Basic specifications and the like are also described. An already created drawing (CAD data etc.) may be used for the two-dimensional drawing 101B.

The structure information 101 on the target structure can include a structure type (in the case of a bridge: a girder bridge, a rigid frame bridge, a truss bridge, an arch bridge, a cable-stayed bridge, a suspension bridge), a material (steel, weather-resistant steel, reinforced concrete, prestressed concrete (PC)), and a size (length, width, etc.).

Further, the structure information 101 on the target structure may include other information including environmental information (described later).

Monitoring Candidate Portion Determination Step

As presented in FIG. 4, a monitoring candidate portion determination step (step S2) determines a monitoring candidate portion where damage is likely to occur based on the structure information on the target structure. The monitoring candidate portion determination processing unit 53 of the CPU 20 determines the monitoring candidate portion where damage is likely to occur based on the structure information on the target structure.

Next, some examples of preferable processing in the monitoring candidate portion determination step (step S2) will be described.

First Aspect

A first aspect of the monitoring candidate portion determination step (step S2) acquires data of a monitoring candidate portion having a correspondence relationship with a structure identical or similar to a structure that is a monitoring design target from a first database that holds correspondence relationships between structures and members, and monitoring candidate portions (portions where damage is likely to occur), and executes monitoring candidate portion determination processing.

Figure 6:
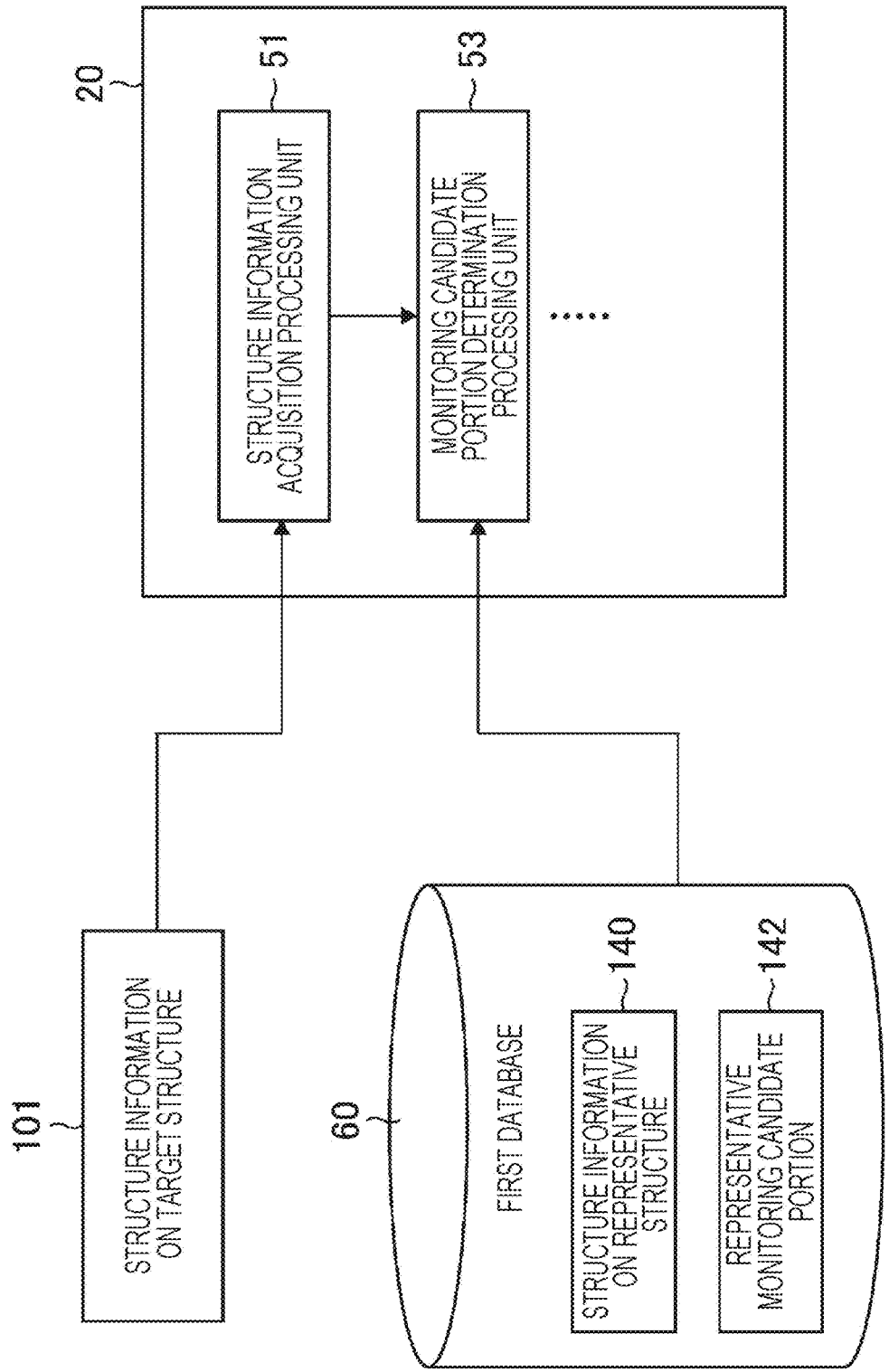
FIG. 6 is a block diagram for explaining a first aspect of a monitoring candidate portion determination step.

FIG. 6 is a block diagram for explaining the first aspect of the monitoring candidate portion determination step (step S2).

As illustrated in FIG. 6, a first database 60 holds a correspondence relationship between structure information 140 on a representative structure and a representative monitoring candidate portion 142.

The structure information 140 on the representative structure is, for example, a concrete bridge described in "Kyoryo Teiki Tenken Yoryo" (Bridge Periodic Inspection Procedure) (March, 2019) by Ministry of Land, Infrastructure, Transport and Tourism. An example of a portion of interest that needs to be focused with emphasis thereon in a periodic inspection of the concrete bridge is described. The portion of interest corresponds to the representative monitoring candidate portion 142. Examples of the portion of interest serving as the representative monitoring candidate portion 142 include (1) an end support portion, (2) an intermediate support portion, (3) a mid-span portion, (4) a ¼ span portion, (5) a construction joint portion, (6) a segment joint portion, (7) a fixing portion, and (8) a cutout portion. The first database 60 holds a correspondence relationship between a concrete bridge, which is the structure information 140 on the representative structure, and a portion of interest, which is the representative monitoring candidate portion 142.

Further, the structure information 140 on another representative structure is, for example, a road tunnel described in "Doro Tonneru Teiki Tenken Yoryo" (Road Tunnel Periodic Inspection Procedure) (March, 2019) by Ministry of Land, Infrastructure, Transport and Tourism. An example of a portion of interest where a similar defect occurs depending on a construction method or the like of a road tunnel is described. The portion of interest corresponds to the representative monitoring candidate portion 142. Examples of the portion of interest serving as the representative monitoring candidate portion 142 include (1) a joint of a lining and a construction joint, (2) the vicinity of a top end of the lining, and (3) the vicinity of the middle of a lining span. The first database 60 holds a correspondence relationship between a road tunnel, which is the structure information 140 on the representative structure, and a portion of interest, which is the representative monitoring candidate portion 142.

The monitoring candidate portion determination processing unit 53 detects a representative structure identical or similar to the target structure based on the structure information 101 on the target structure and the structure information 140 on the representative structure. Then, the monitoring candidate portion determination processing unit 53 acquires information on the representative monitoring candidate portion 142 having the correspondence relationship with the structure information 140 on the representative structure from the first database 60, and determines the representative monitoring candidate portion 142 as a monitoring candidate portion of the target structure. The monitoring candidate portion determination processing unit 53 can determine a plurality of monitoring candidate portions.

Second Aspect

A second aspect of the monitoring candidate portion determination step (step S2) extracts a similar structure having a structure similar to the structure that is the monitoring design target from a second database that holds correspondence relationships between structures of various reference structures and damage information (position, region, size, level, progress, etc.), and executes monitoring candidate portion determination processing based on data of the correspondence relationship between the structure of the similar structure and the damage information.

Figure 7:
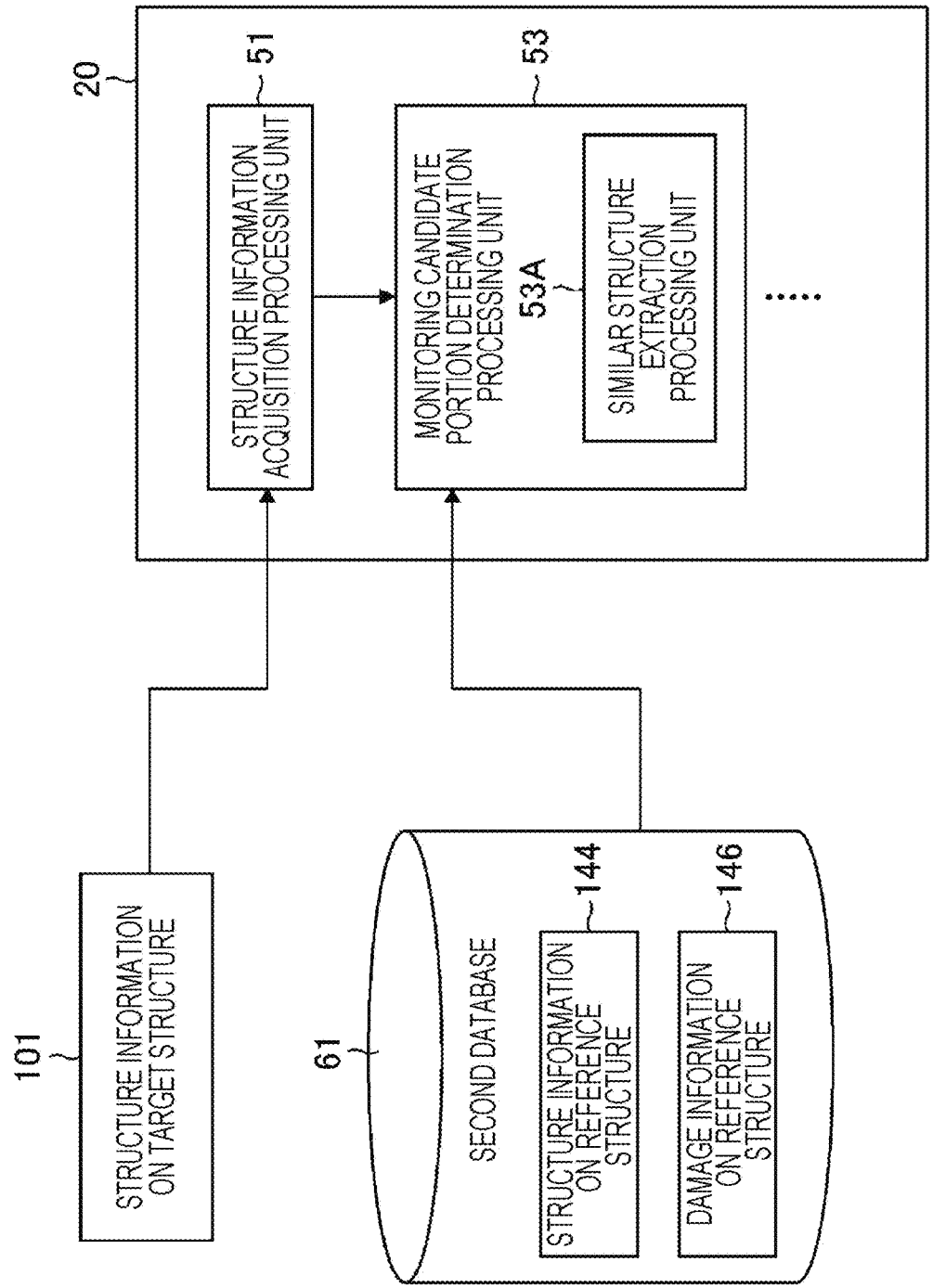
FIG. 7 is a block diagram for explaining a second aspect of the monitoring candidate portion determination step.

FIG. 7 is a block diagram for explaining the second aspect of the monitoring candidate portion determination step (step S2).

As illustrated in FIG. 7, a second database 61 holds a correspondence relationship between structure information 144 on a reference structure and damage information 146 on the reference structure.

The monitoring candidate portion determination processing unit 53 further includes a similar structure extraction processing unit 53A. The similar structure extraction processing unit 53A extracts a reference structure similar to the target structure from the second database 61 based on the structure information 101 on the target structure and the structure information 144 on the reference structure.

The monitoring candidate portion determination processing unit 53 determines a monitoring portion based on the damage information 146 having the correspondence relationship with the structure information 144 on the extracted reference structure. The monitoring candidate portion determination processing unit 53 can determine, for example, a predetermined portion where the damage has actually progressed in the similar structure as a monitoring candidate portion. When the predetermined portion is determined, the number of portions may be limited to, for example, 10 portions.

The similar structure extraction processing unit 53A can determine and extract a similarity between the structure information 101 on the target structure and the structure information 144 on the reference structure based on the structure information. The monitoring candidate portion determination processing unit 53 can determine a plurality of monitoring candidate portions.

The structure information include, for example, a structure type (in the case of a bridge: a girder bridge, a rigid frame bridge, a truss bridge, an arch bridge, a cable-stayed bridge, a suspension bridge), a member type (in the case of a bride: a floor slab, a bridge pier, a bridge abutment, a girder, etc.), a material (steel, reinforced concrete, prestressed concrete (PC), etc.), and a size (length, width, height, etc.).

Also, the similarity can be determined and extracted based on any one or more items of the following other information in addition to the above-described structure information.

Other Information

The environmental information can include a traffic volume (per day, per month, per year, cumulative volume, etc.), a location (distance from sea, river bridge/overpass bridge/overrail bridge, etc.), climate (average temperature, average humidity, rainfall, snowfall, etc.), a construction condition, the number of years (elapsed years from completion date, use start date, etc.), a repair history, and a disaster history (earthquake, typhoon, flood, etc.).

FIG. 8 is a graph presenting an example of a method of extracting a similar structure by the similar structure extraction processing unit 53A.

In FIG. 8, in a feature space defined by a feature vector A and a feature vector B, structure information 144 on a reference structure stored in the second database 61 and structure information 101 on a target structure are plotted.

In FIG. 8, the structure information 144 on the reference structure stored in the second database 61 is indicated by a mark of x, and the structure information 101 on the target structure is indicated by a mark of ●. Also, the feature vector A represents a bridge length (m), and the feature vector B represents the number of years after the start of use of the structure. The feature space using the feature vectors can be a multidimensional space consisting of three or more feature vectors, but is illustrated as a two-dimensional space consisting of two feature vectors in FIG. 8 for simplicity.

In the feature space presented in FIG. 8, the similar structure extraction processing unit 53A calculates a distance between a feature vector (first feature vector) of the structure that is the current monitoring design target indicated by the mark of ● and a feature vector (second feature vector) of the structure information in the second database 61 indicated by the mark of x, and extracts a structure indicated by the mark of x having a distance of a threshold value or less (within a circle indicated by a dotted line in FIG. 8) as a similar structure. This threshold value can be optimized by a statistical technique.

The distance may be a distance (Euclidean distance) when a plurality of parameters of the first feature vector and the second feature vector are not weighted, or may be a distance (Mahalanobis distance) when a plurality of parameters of the first feature vector and the second feature vector are weighted. Which weight is assigned to which parameter may be determined by a statistical technique such as principal component analysis.

In addition to the determination as described above, an additional search condition can be designated as a point or a range in the feature space. For example, when a bridge whose completion date is Jan. 1, 1990 or later, and whose basic structure is a girder bridge, or the like, is designated, a similar structure can be extracted within the designated range.

In addition to the above, it is possible to set information included in environmental information or the like as an axis of the feature space and extract a similar structure.

Note that, as a technique of extracting a similar structure, a technique different from the technique of performing determination using the distance in the feature space may be used. For example, a similar structure may be extracted using artificial intelligence (AI) for determining the similarity from an image, or AI for determining the similarity using an image and the above-described various items of information in combination.

Third Aspect

A third aspect of the monitoring candidate portion determination step (step S2) simulates a deterioration factor based on the structure information 101 on the target structure that is the monitoring design target, and determines a predetermined portion in the order from one with large influence of the deterioration factor as a monitoring candidate portion. When the predetermined portion is determined, the number of portions may be limited to, for example, 10 portions.

The monitoring candidate portion determination processing unit 53 can include, for example, a simulation processing unit (not illustrated) that executes a simulation of stress distribution by a finite element method or the like, or a simulation of adhesion of airborne salt by fluid analysis in consideration of the influence of wind or the like.

Damage Information Acquisition Step

As presented in FIG. 4, a damage information acquisition step (step S3) acquires damage information on the target structure including information relating to a damage position and a damage level in the target structure.

The damage information acquisition processing unit 55 of the CPU 20 acquires the damage information on the target structure including the information relating to the damage position and the damage level in the target structure.

The damage information acquisition processing unit 55 acquires a corresponding image 103 from the storage unit 16. The damage information acquisition processing unit 55 has a determination processing unit (not illustrated) that determines a damage level (for example, damage size (width, length, area, depth, etc.), a damage rank, a countermeasure category, or soundness) from the corresponding image 103, and can acquire damage information on the target structure including information on the damage level from the corresponding image 103 and the determination processing unit.

The damage information acquisition processing unit 55 of the CPU 20 acquires corresponding images 103 at at least two different timings from the storage unit 16. The damage information acquisition processing unit 55 has a determination processing unit (not illustrated) that determines a progress of damage (a progress of damage size, a progress of damage rank, etc.) from the corresponding images 103 of the images at the at least two different timings, and can acquire damage information on the target structure including information on the damage level from the corresponding images 103 and the determination processing unit. Since the corresponding images 103 are the images at the at least two different timings, the corresponding images 103 at three or more timings (for example, timing 1, timing 2, and timing 3) can be acquired. For example, it is also possible to obtain the average of the progress between the timing 1 and the timing 2 and the progress between the timing 2 and the timing 3 from the corresponding images 103.

The damage information acquisition processing unit 55 can automatically acquire damage information on the target structure using image analysis or the like. The user can edit the acquired damage information on the target structure.

FIG. 9 presents an example of damage information on a target structure. Damage information 105 on a target structure presented in FIG. 9 includes a member (damage position), a damage type, a damage dimension, a damage level, and a temporal change. The damage information 105 may include at least one of the damage position, the damage type, or the damage level of the target structure. Also, the damage information 105 may include, for example, a damage factor in addition to the damage information presented in FIG. 9.

FIG. 10 is a diagram for explaining association between structure information and damage information on a target structure. FIG. 10 illustrates a three-dimensional model 101A that is an item of the structure information 101 on the target structure. Any portion on the three-dimensional model 101A can be partially enlarged as indicated by an arrow. The enlarged three-dimensional model 101A is associated with each item of information. The enlarged three-dimensional model 101A is associated with a two-dimensional drawing 101B. The three-dimensional model 101A and the two-dimensional drawing 101B are also associated with a panoramic composite image. The three-dimensional model 101A is associated with a corresponding image 103A actually captured. An image corresponding to any portion can be referred to without being limited to the image of the damage portion. The three-dimensional model 101A is associated with a corresponding image 103B that holds damage information 105 (not illustrated) together. The damage information 105 can include the type, level, size, progress, factor, and the like, of the damage. The two-dimensional drawing 101B is associated with a corresponding image 103B. The user can cause the display device 30 or the like to display the above-described correspondence relationship. Also, the user can edit these items of information as necessary.

Monitoring Portion Determination Step

As presented in FIG. 4, a monitoring portion determination step (step S4) determines a monitoring portion from the monitoring candidate portion based on the damage level included in the damage information on the target structure corresponding to the monitoring candidate portion.

The monitoring portion determination processing unit 57 of the CPU 20 determines the monitoring portion from the monitoring candidate portion based on the damage level included in the damage information on the target structure corresponding to the monitoring candidate portion.

Next, preferable processing in the monitoring portion determination step (step S4) will be described.

In the monitoring portion determination step (step S4), monitoring portion determination processing of determining, as a monitoring portion, a monitoring candidate portion from which the damage portion exists within a predetermined distance and whose damage level is included in the setting is executed.

Figure 11:
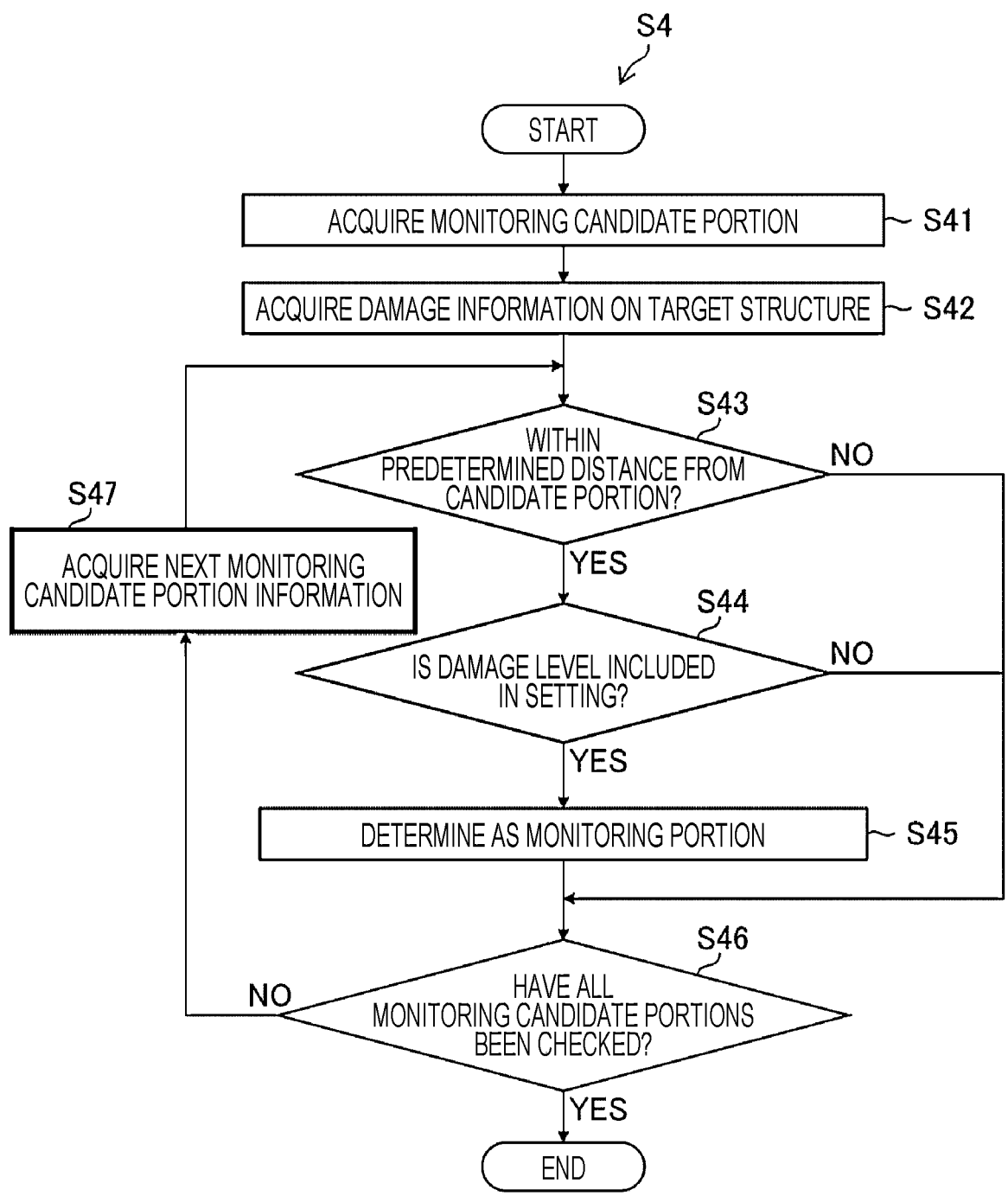
FIG. 11 is a flowchart presenting a monitoring portion determination step.

FIG. 11 is a flowchart presenting a monitoring portion determination step. As presented in FIG. 11, the monitoring portion determination processing unit 57 acquires the monitoring candidate portion (step S41) determined in the monitoring candidate portion determination step (step S2).

Next, the monitoring portion determination processing unit 57 acquires the damage information on the target structure (step S42) acquired in the damage information acquisition step (step S3).

Next, the monitoring portion determination processing unit 57 determines whether the damage of the target structure is within the predetermined distance from the monitoring candidate portion (step S43). In step S43, whether the damage of the target structure is within the predetermined distance from the monitoring candidate portion and is on the same member as the member of the monitoring candidate portion can be set as a condition for the determination.

When the damage is within the predetermined distance from the monitoring candidate portion (YES in step S43), the monitoring portion determination processing unit 57 determines whether the damage level of the target structure is included in the setting.

Here, the setting is a criterion that can be desirably determined by the user. As the setting, for example, the number of portions can be set to several portions (for example, 10 portions, 20 portions, etc.) in the order from the worst damage level or in the order from the fast progress rate. As another setting, the damage level can be a predetermined threshold value or more (for example, when the damage rank includes five stages of a, b, c, d, and e, the damage rank is d or more, a is no damage, and e is the largest damage). Note that the progress rate may be obtained from a change in damage length per year, a change in damage width per year, a change in damage area per year, or the like. The criterion may be set to be comprehensively determined from both the damage level and the progress of damage.

Further, in a case where a third database 63 (see FIG. 15) that holds information relating to a sensor capable of monitoring a monitoring portion (described later) is provided, the setting can be a range within the budget from a portion having a worse damage level (or a portion having a faster progress).

When the damage level is included in the setting (YES in step S44), the monitoring portion determination processing unit 57 determines that the monitoring candidate portion is a monitoring portion (step S45).

Next, the processing proceeds to determination on whether all monitoring candidate portions have been checked (step S46). Even in the case of NO in step S43 and step S44, the processing proceeds to the determination on whether all monitoring candidate portions have been checked (step S46).

In the case of NO in step S46, the processing returns to step S43 via a step of acquiring the next monitoring candidate portion information (step S47), and step S43 to step S46 are repeated until YES is obtained in step S46. In the case of YES in step S46, the monitoring portion determination step (step S4) is ended.

Monitoring Portion Output Step

As presented in FIG. 4, a monitoring portion output step (step S5) outputs the determined monitoring portion.

The output processing unit 59 of the CPU 20 outputs the determined monitoring portion in the form of, for example, a three-dimensional model, a two-dimensional drawing, or a list. Also, the output processing unit 59 can output a monitoring portion created in such a form to the display device 30 or in a data file form.

Figure 12:
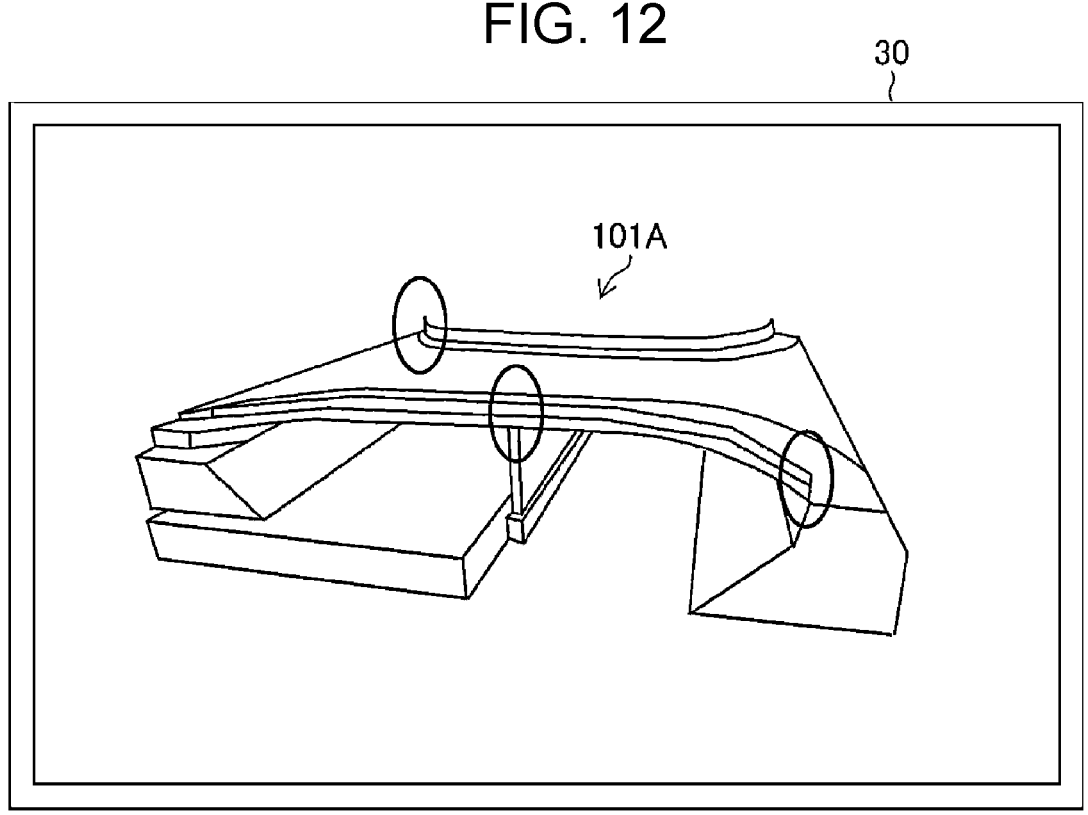
FIG. 12 is a view illustrating an example of an output to a display device.

FIG. 12 is a view illustrating an example of an output to the display device 30. As illustrated in FIG. 12, a three-dimensional model 101A is displayed on the display device 30. Further, the determined monitoring portion is surrounded by a solid-line circle. In FIG. 10, three monitoring portions are indicated. The user can execute efficient monitoring for a structure by using the monitoring design support apparatus 10. Also, the user can easily determine a monitoring portion.

Figure 13:
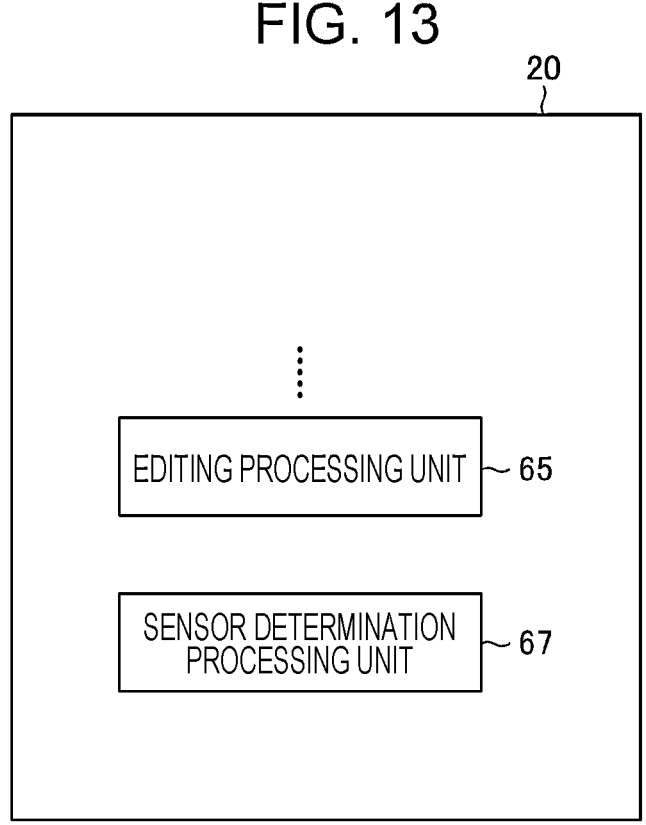
FIG. 13 is a block diagram illustrating additional processing functions implemented by the CPU.

Next, preferred aspects of the monitoring design support apparatus and the monitoring design support method will be described. FIG. 13 is a block diagram illustrating additional processing functions implemented by the CPU. As illustrated in FIG. 13, the CPU 20 can further include an editing processing unit 65 and a sensor determination processing unit 67. Hereinafter, the editing processing unit 65 and the sensor determination processing unit 67 will be described.

Editing Processing

The editing processing unit 65 of the CPU 20 receives editing for a monitoring portion and executes editing processing of changing the monitoring portion.

Figure 14A:
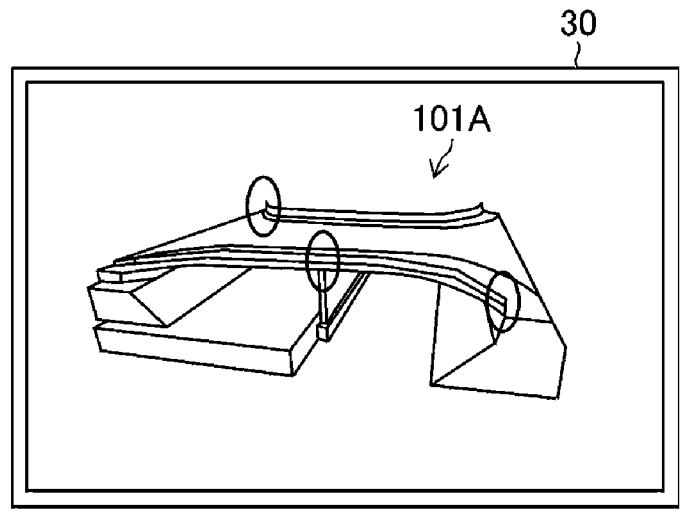
FIGS. 14A to 14C are views illustrating an example of editing processing.
Figure 14B:
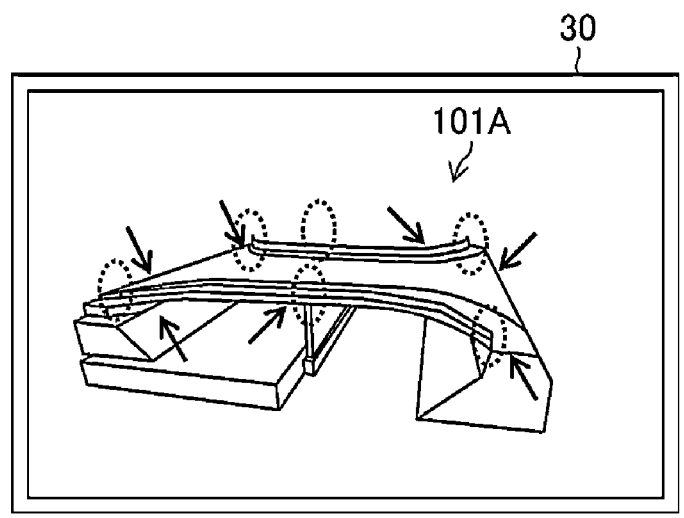
Figure 14C:
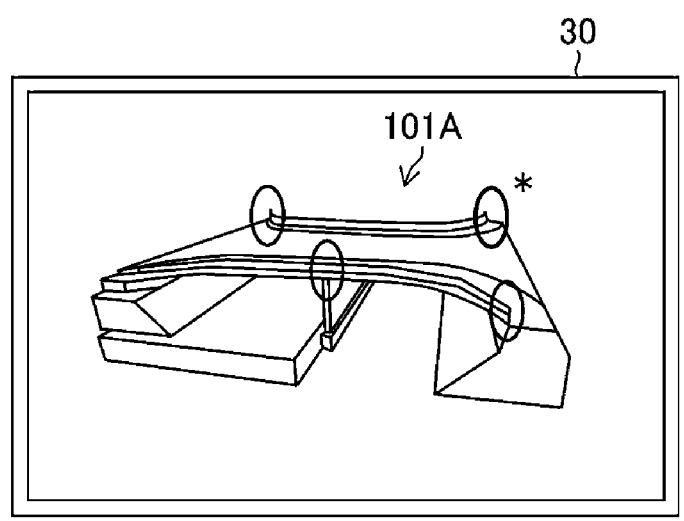

FIGS. 14A to 14C are views illustrating an example of the editing processing. In FIG. 14A, the monitoring portion (a region surrounded by a circle) determined in step S4 is indicated on a three-dimensional model 101A. FIG. 14A indicates the same result as that in FIG. 12.

Next, when the user executes the editing processing, as illustrated in FIG. 14B, the monitoring candidate portion determined in step S2 is displayed on the three-dimensional model 101A in a manner surrounded by a broken-line circle instead of the determined monitoring portion. Further, the position of the damage information acquired in step S3 is displayed with an arrow on the three-dimensional model 101A.

The user can simultaneously check the monitoring candidate portion and the actual damage position using the display device 30. The user can check a corresponding image 103 (not illustrated) as illustrated in FIG. 10 and damage information 105 by further designating the damage position. The user can manually determine the monitoring portion from these items of information.

In FIG. 14C, the edited monitoring portion is indicated on the three-dimensional model 101A. In FIG. 14C, the monitoring portion added by the user is surrounded by a solid line thicker than lines of the other portions, and is displayed together with "*". It is possible to easily recognize that the user has added the information by editing.

FIGS. 14A to 14C illustrate the example of the editing processing; however, the present invention is not limited thereto, and the user can execute editing for the monitoring portion on, for example, a two-dimensional drawing or a list.

Sensor Determination Processing

The sensor determination processing unit 67 of the CPU 20 executes sensor determination processing of determining a sensor to be applied from a third database that holds information relating to a sensor capable of monitoring the monitoring portion based on the damage information on the monitoring portion.

Figure 15:
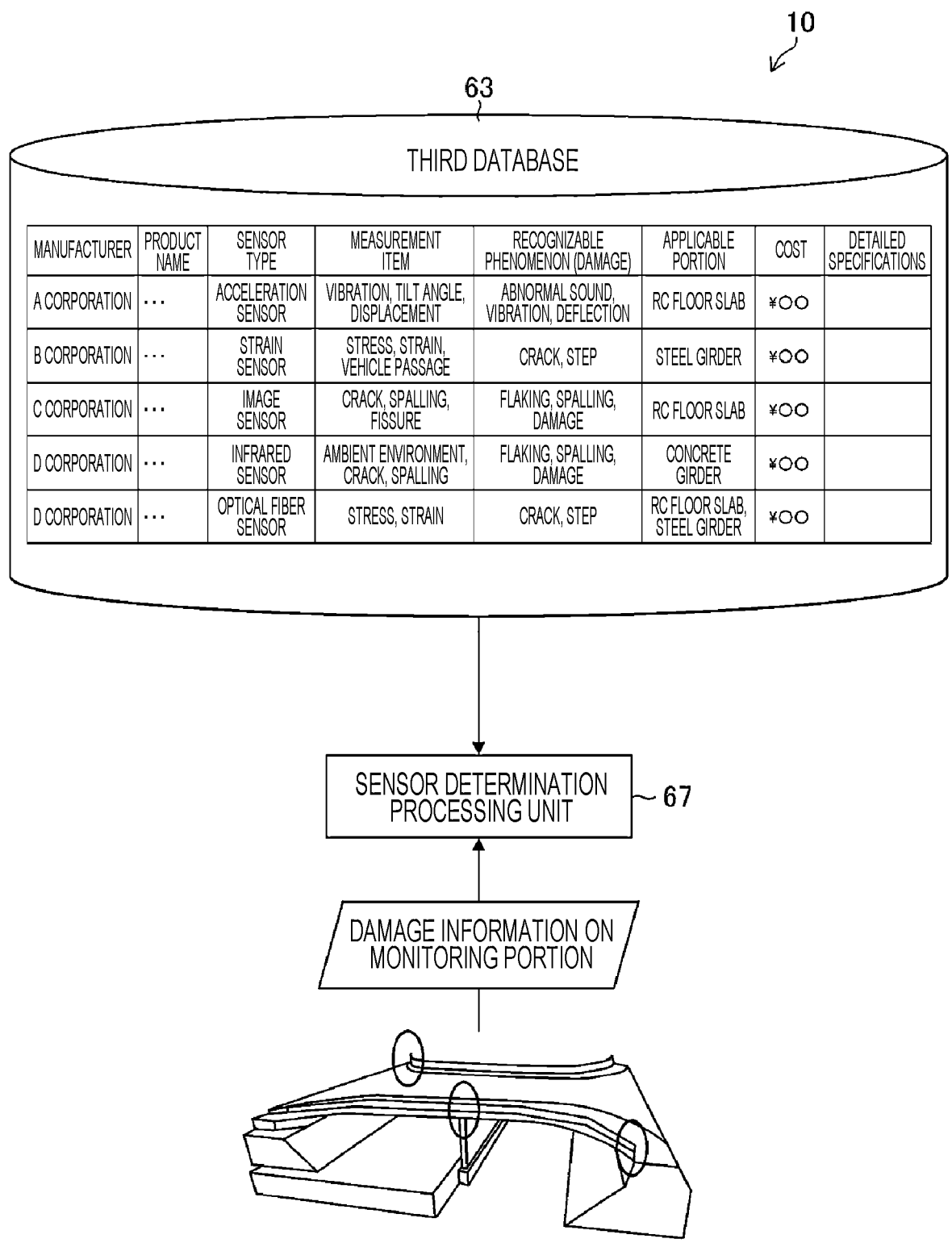
FIG. 15 is a block diagram for executing sensor determination processing.

FIG. 15 is a block diagram for executing the sensor determination processing. As illustrated in FIG. 15, the monitoring design support apparatus 10 includes a third database 63. The third database 63 holds information relating to a sensor. The third database 63 may be configured so that the user can add information.

The third database 63 can include information such as a manufacturer, a product name, a sensor type, a measurement item, a recognizable phenomenon (damage), an applicable portion, cost, and detailed specifications. The correspondence relationship between the sensor type and the measurement item can be found in "Doboku Kozobutsu no Tame no Monitaringu Sisutemu Katsuyo Gaidorain no Yoten Kaisetsu" (Summary of Monitoring System Utilization Guidelines for Civil Engineering Structures) (http://raims.or.jp/release/pdf/201905_raims_6.pdf) that is a reference written by Research Association for Infrastructure Monitoring System (RAIMS). The correspondence relationship between the measurement item and the recognizable phenomenon can be found in "Monitaringu Gijutsu no Genjo to Kadai" (Current Situations and Problems of Monitoring Technology) (https://www.mlit.go.jp/common/001016261.pdf) that is a reference written by Ministry of Land, Infrastructure, Transport and Tourism.

Examples of the applicable portion include a reinforced concrete (RC) floor slab, a concrete girder, a steel girder, a bridge pier, and a foundation. The cost can include information, such as installation cost, operation cost (per year etc.), and removal cost. The detailed specifications can include information, such as a sensing frequency, sensing accuracy, an operation guarantee condition (temperature, humidity, etc.), and an operation guarantee period.

The sensor determination processing unit 67 can determine a sensor corresponding to the applicable portion and the phenomenon (damage) to be recognized from the third database 63 and the damage information on the monitoring portion. Also, the sensor can be determined in accordance with the operation guarantee condition, required accuracy, and the like. The operation period may be expected and the sensor may be determined so that the total cost is minimized. For example, when the expected operation period is 10 years, the sensor with the minimum cost (installation cost+operation cost) in 10 years may be selected.

Others

In the above-described embodiments, the hardware structures of processing units that execute various kinds of processing are various processors as described below. The various processors include a central processing unit (CPU) that is a general-purpose processor that executes software (program) to function as various processing units; a programmable logic device (PLD) that is a processor whose circuit configuration can be changed after manufacture, such as a field programmable gate array (FPGA); a dedicated electric circuit that is a processor having a circuit configuration designed exclusively for executing specific processing, such as an application specific integrated circuit (ASIC); and the like.

One processing unit may be constituted of one of these various processors, or may be constituted of two or more processors of the same type or different types (for example, a plurality of FPGAs or a combination of a CPU and an FPGA). Alternatively, a plurality of processing units can be constituted of one processor. As an example in which the plurality of processing units are constituted of one processor, first, there is an embodiment in which one processor is constituted of a combination of one or more CPUs and software, and the processor functions as the plurality of processing units, as typified by a computer such as a client or a server. Second, there is an embodiment of using a processor that implements the functions of the entire system including a plurality of processing units by one integrated circuit (IC) chip, as typified by a system on chip (SoC) or the like. As described above, the various processing units are constituted using one or more of the above-described various processors as the hardware structures.

Further, more specifically, the hardware structures of these various processors are an electric circuit (circuitry) obtained by combining circuit elements such as semiconductor elements.

Each of the above-described configurations and functions can be appropriately implemented by any hardware, software, or a combination of both. For example, the present invention can be applied to a program for causing a computer to execute the above-described processing steps (processing procedures), a computer-readable recording medium (non-transitory recording medium) having such a program recorded therein, or a computer capable of installing such a program.

Although the examples of the present invention have been described above, the present invention is not limited to the above-described embodiments, and of course various modifications can be made without departing from the spirit of the present invention.

REFERENCE SIGNS LIST 10 monitoring design support apparatus
12 input/output interface
16 storage unit
18 operating unit
20 CPU
22 RAM
24 ROM
26 display control unit
30 display device
51 structure information acquisition processing unit
53 monitoring candidate portion determination processing unit
53A similar structure extraction processing unit
55 damage information acquisition processing unit
57 monitoring portion determination processing unit
59 output processing unit
60 first database
61 second database
63 third database
65 editing processing unit
67 sensor determination processing unit
101 structure information
101A three-dimensional model
101B two-dimensional drawing
103 corresponding image
103A corresponding image
103B corresponding image
105 damage information
131 floor slab
133 bridge pier
135 bridge abutment
140 structure information on representative structure
142 representative monitoring candidate portion
144 structure information on reference structure
146 damage information on reference structure

What is claimed is:

1. A monitoring design support apparatus that supports a monitoring system for monitoring progression of deterioration of a structure, comprising:
a structure database which stores structure information of structures and images of structures; and
a processor configured to:
acquire structure information on a target structure and an image of the target structure, from the structure database based on an operation of a user;
determine one or more portions where damage is likely to occur based on the structure information on the target structure as monitoring candidate portions at which progression of deterioration of the target structure is to be monitored by sensors;
acquire damage information on the target structure including information relating to a damage position and a damage level in the target structure, from the image of the target structure;
determine a monitoring portion at which progression of deterioration is to be monitored by sensors from among the monitoring candidate portions based on the damage level included in the damage information corresponding to the monitoring candidate portions; and
output the monitoring portion to the user.

2. The monitoring design support apparatus according to claim 1, further comprising:
a first database that holds a correspondence relationship between structure information on a representative structure and a representative monitoring candidate portions,
wherein the processor acquires information on the representative monitoring candidate portions having the correspondence relationship with the representative structure identical or similar to the target structure from the first database based on the structure information on the target structure and the structure information on the representative structure, and determines the monitoring candidate portions.

3. The monitoring design support apparatus according to claim 1, further comprising:
a second database that holds a correspondence relationship between structure information on a reference structure and damage information on the reference structure,
wherein the processor extracts the reference structure similar to the target structure from the second database based on the structure information on the target structure and the structure information on the reference structure, and
wherein the processor determines the monitoring candidate portions based on the damage information having the correspondence relationship with the structure information on the extracted reference structure.

4. The monitoring design support apparatus according to claim 3,
wherein the second database holds other information relating to the reference structure, and
wherein the processor extracts the reference structure similar to the target structure from the second database based on the structure information on the target structure, the structure information on the reference structure, other information on the target structure, and the other information relating to the reference structure.

5. The monitoring design support apparatus according to claim 1,
wherein the processor simulates a deterioration factor based on the structure information on the target structure, and
wherein the processor determines the monitoring candidate portions based on a result of the simulation.

6. The monitoring design support apparatus according to claim 1, wherein, based on an image associated with a position on the target structure and a damage level determined from the image, the processor acquires information relating to the damage level.

7. The monitoring design support apparatus according to claim 1, wherein, based on a damage level determined from images obtained at at least two different timings and associated with a position on the target structure, the processor acquires information relating to the damage level.

8. The monitoring design support apparatus according to claim 1, wherein the processor determines, as the monitoring portion, the monitoring candidate portions from which the damage portion exists within a predetermined distance and for which the damage level is included in a setting.

9. The monitoring design support apparatus according to claim 8, wherein the processor determines, as the monitoring portion, the monitoring candidate portions located on a same member as a member of the monitoring candidate portions.

10. The monitoring design support apparatus according to claim 1, wherein the processor receives editing for the monitoring portion, and performs editing of changing the monitoring portion.

11. The monitoring design support apparatus according to claim 10, wherein the processor receives the editing on a three-dimensional model, a two-dimensional drawing, or a list displayed on a display device.

12. The monitoring design support apparatus according to claim 1, further comprising:
    a third database that holds information relating to a sensor capable of monitoring the monitoring portion,
    wherein the processor determines the sensor to be applied from the third database based on the damage information on the monitoring portion.

13. A monitoring design support method that uses a processor and supports a monitoring system for monitoring progression of deterioration of a structure, the method comprising:
    acquiring by the processor, structure information on a target structure and an image of the target structure, from a structure database which stores structure information of structures and images of structures based on an operation of a user;
    determining by the processor, one or more portions where damage is likely to occur based on the structure information on the target structure as monitoring candidate portions at which progression of deterioration of the target structure is to be monitored by sensors;
    acquiring by the processor, damage information on the target structure including information relating to a damage position and a damage level in the target structure, from the image of the target structure;
    determining by the processor, a monitoring portion at which progression of deterioration is to be monitored by sensors from among the monitoring candidate portions based on the damage level included in the damage information corresponding to the monitoring candidate portions; and
    causing by the processor, to output the monitoring portion to the user.

14. A non-transitory, computer-readable tangible recording medium which records thereon a program for causing, when read by a computer, the computer to implement the functions of:
    acquiring structure information on a target structure and an image of the target structure, from a structure database which stores structure information of structures and images of structures based on an operation of a user;
    determining one or more portions where damage is likely to occur based on the structure information on the target structure as monitoring candidate portions at which progression of deterioration of the target structure is to be monitored by sensors;
    acquiring damage information on the target structure including information relating to a damage position and a damage level in the target structure, from the image of the target structure;
    determining a monitoring portion at which progression of deterioration is to be monitored by sensors from among the monitoring candidate portions based on the damage level included in the damage information corresponding to the monitoring candidate portions; and
    outputting the monitoring portion to the user.

15. A monitoring design support apparatus that supports monitoring design for a structure, comprising:
    a structure database which stores structure information of structures and images of structures; and
    a processor configured to:
        acquire structure information on a target structure from the structure database based on an operation of a user;
        determine a monitoring candidate portion where damage is likely to occur based on the structure information on the target structure;
        acquire damage information on the target structure including information relating to a damage position and a damage level in the target structure;
        determine a monitoring portion from the monitoring candidate portion based on the damage level included in the damage information on the target structure corresponding to the monitoring candidate portion; and
        output the monitoring portion to the user,
    wherein the processor simulates a deterioration factor based on the structure information on the target structure and determines the monitoring candidate portions based on a result of the simulation, or
    wherein the processor determines, as the monitoring portion, the monitoring candidate portions from which the damage portion exists within a predetermined distance and for which the damage level is included in a setting, or
    wherein the monitoring design support apparatus further comprises a third database that holds information relating to a sensor capable of monitoring the monitoring portion, and the processor determines the sensor to be applied from the third database based on the damage information on the monitoring portion.

16. A monitoring design support method that uses a processor and supports monitoring design for a structure, the method comprising:
    acquiring by the processor, structure information on a target structure from a structure database which stores structure information of structures and images of structures based on an operation of a user;
    determining by the processor, a monitoring candidate portion where damage is likely to occur based on the structure information on the target structure;
    acquiring by the processor, damage information on the target structure including information relating to a damage position and a damage level in the target structure;
    determining by the processor, a monitoring portion from the monitoring candidate portion based on the damage level included in the damage information on the target structure corresponding to the monitoring candidate portion; and
    outputting by the processor, the monitoring portion to the user,
    wherein the processor simulates a deterioration factor based on the structure information on the target structure and determines the monitoring candidate portions based on a result of the simulation, or wherein the processor determines, as the monitoring portion, the monitoring candidate portions from which the damage portion exists within a predetermined distance and for which the damage level is included in a setting, or wherein the processor determines, from a third database that holds information relating to a sensor capable of monitoring the monitoring portion, the sensor to be applied based on the damage information on the monitoring portion.

17. A non-transitory, computer-readable tangible recording medium which records thereon a program for causing, when read by a computer, the computer to implement the functions of:

acquiring structure information on a target structure from a structure database which stores structure information of structures and images of structures based on an operation of a user;

determining a monitoring candidate portion where damage is likely to occur based on the structure information on the target structure;

acquiring damage information on the target structure including information relating to a damage position and a damage level in the target structure;

determining a monitoring portion from the monitoring candidate portion based on the damage level included in the damage information on the target structure corresponding to the monitoring candidate portion; and outputting the monitoring portion to the user, wherein the program, when read by the computer, further causes the computer to implement the functions of:

simulating a deterioration factor based on the structure information on the target structure and determining the monitoring candidate portions based on a result of the simulation, or determining, as the monitoring portion, the monitoring candidate portions from which the damage portion exists within a predetermined distance and for which the damage level is included in a setting, or determining, from a third database that holds information relating to a sensor capable of monitoring the monitoring portion, the sensor to be applied based on the damage information on the monitoring portion.

* * * * *